United States Patent

Miyawaki et al.

[11] Patent Number: 5,822,633
[45] Date of Patent: Oct. 13, 1998

[54] FILM CARTRIDGE SUPPORTING DEVICE FOR CAMERA

[75] Inventors: Makoto Miyawaki; Tetsuya Nishio, both of Kanagawa, Japan

[73] Assignee: Canon Kabushiki Kaisha, Tokyo, Japan

[21] Appl. No.: 794,410

[22] Filed: Feb. 5, 1997

Related U.S. Application Data

[63] Continuation of Ser. No. 349,725, Dec. 5, 1994, abandoned.

[30] Foreign Application Priority Data

Dec. 14, 1993 [JP] Japan .................................. 5-342050

[51] Int. Cl.⁶ .................................................. G03B 17/02
[52] U.S. Cl. ............................................................ 396/538
[58] Field of Search ...................................... 396/535, 536, 396/538

[56] References Cited

U.S. PATENT DOCUMENTS 5,255,034 10/1993 Shimada et al. ...................... 354/173.1
5,621,493 4/1997 Wada et al. .............................. 396/538

*Primary Examiner*—Howard B. Blankenship
*Attorney, Agent, or Firm*—Robin, Blecker & Daley

[57] ABSTRACT

A camera or an apparatus adapted for use of an image recording medium cartridge, or a unit applicable to the camera or the apparatus, includes a support part for supporting the cartridge. The support part is provided with a curved surface part formed where the support part engages the shaft of the cartridge loaded on the camera or the apparatus.

10 Claims, 9 Drawing Sheets

FILM CARTRIDGE SUPPORTING DEVICE FOR CAMERA

This is a continuation application under 37 CFR 1.62 of prior application Ser. No. 08/349,725, filed Dec. 5, 1994, now abandoned.

BACKGROUND OF THE INVENTION

1. Field of the Invention

This invention relates to an improvement on a film cartridge supporting device for supporting a film cartridge to be loaded on a camera.

2. Description of the Related Art

A film transport device disclosed in Japanese Laid-Open Patent Application No. HEI 4-234744, etc., is arranged to ensure a smooth film transportation by pivotally supporting a film cartridge from both the upper and lower ends of the cartridge shaft in such a manner as to enhance a positional accuracy such as concentricity, etc., unlike the conventional device which supports the film cartridge around the external shape of the film cartridge.

The film transport device disclosed in Japanese Laid-Open Patent Application No. HEI 4-234744, however, has presented the following problems:

1) In a case where a cartridge chamber lid for opening and closing a cartridge chamber is designed to rotate on a hinge shaft in a generally practiced manner, the arcuate turning motion of the cartridge chamber lid prevents an engaging shaft from smoothly engaging a cartridge shaft hole, if the length of engagement of the engaging shaft with the cartridge shaft hole is long. FIG. 8 shows in a vertical section a part of the cartridge chamber and the cartridge chamber lid in question. The cartridge chamber lid 101 is provided with an engaging shaft 101a. If the engaging shaft 101a is long, the engaging shaft 101a abuts on a cartridge shaft hole 102a formed in a cartridge shaft 102 and fails to be fitted into the cartridge shaft hole 102a, as shown in FIG. 8. Under such a condition, the cartridge chamber lid 101 cannot be closed.

2) In order to accurately position the film, the vertical position of the cartridge shaft must be regulated. The above-stated example of prior art has not been arranged to fully meet this requirement.

3) It is conceivable to design the cartridge chamber lid to be slidable perpendicular to the cartridge shaft. In such a case, however, it is difficult to arrange an engaging shaft provided on the cartridge chamber lid to smoothly engage the cartridge shaft. In other words, referring to FIG. 9 which is a vertical section showing the cartridge chamber, an engaging shaft 201a provided on the cartridge chamber lid 201 tends to abut on the film cartridge 202 to prevent the cartridge chamber lid 201 from being closed. In FIG. 9, reference numeral 203 denotes a film, and reference numeral 204 denotes a cartridge shaft which is provided with a cartridge shaft hole 204a.

SUMMARY OF THE INVENTION

It is one aspect of this invention to provide a camera or an apparatus, or a unit applicable to the camera or the apparatus, adapted for using a cartridge containing an image recording medium therein, wherein a support part for supporting the cartridge is arranged to have a curved surface at a part where the support part engages a shaft of the cartridge when the cartridge is loaded, so that the loaded cartridge can be smoothly and precisely supported.

The above and other aspects of this invention will become apparent from the following detailed description of preferred embodiments thereof taken in connection with the accompanying drawings.

DETAILED DESCRIPTION OF THE PREFERRED EMBODIMENTS

Some of preferred embodiments of this invention are described below with reference to the drawings.

Figure 1:
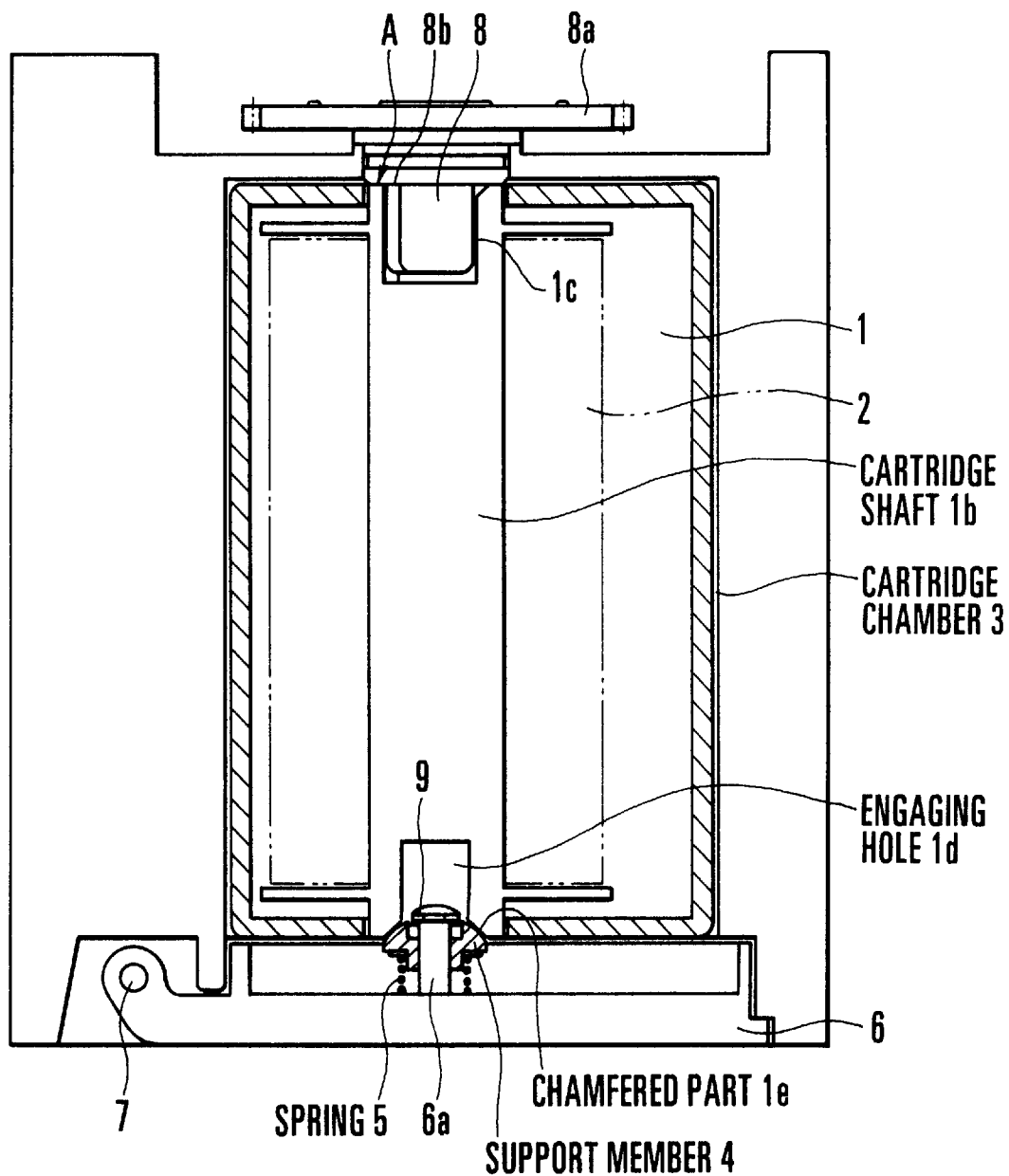
FIG. 1 is a vertical section showing a part around a cartridge chamber of a camera arranged according to this invention as a first embodiment thereof.
Figure 2:
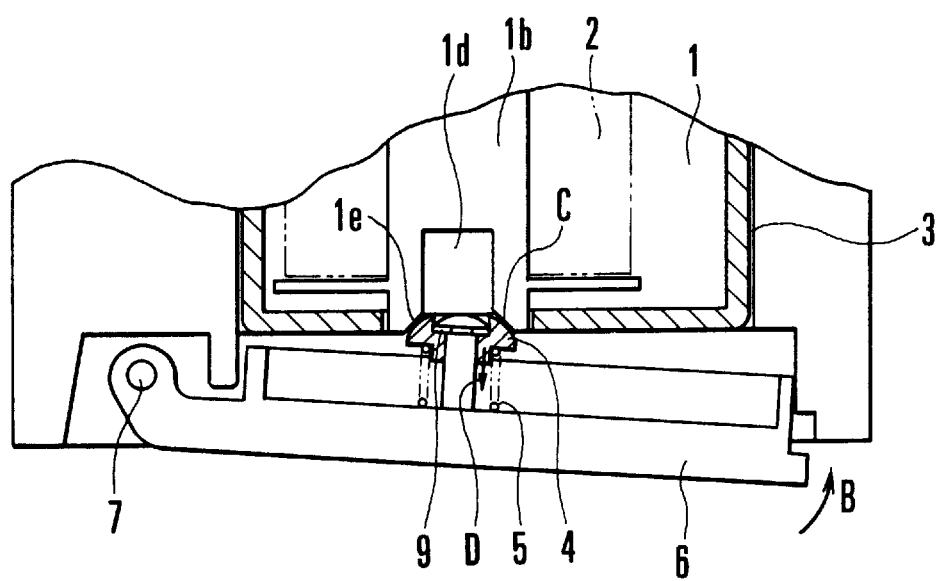
FIG. 2 is a vertical section showing the state where a cartridge chamber lid is in process of being closed.

FIGS. 1 and 2 are vertical sectional views of a camera arranged as a first embodiment of this invention. FIG. 1 shows a part around a cartridge chamber of the camera. FIG. 2 shows the state where the cartridge chamber lid is in process of being closed.

These figures illustrate a film cartridge 1, a cartridge shaft 1b, a fork engaging part 1c which is arranged to be driven by a fork 8, an engaging hole 1d arranged on the support side of the cartridge shaft 1b, a chamfered part 1e formed between the engaging hole 1d of the cartridge shaft 1b and an end face of the cartridge shaft 1b, a film 2 contained in the film cartridge 1, and a cartridge chamber 3 provided in the camera. The fork 8 which is rotatable is arranged to drive the cartridge shaft 1b. A fork gear 8a is arranged to drive the fork 8 by engaging a driving device which is not shown. The fork 8 has a flange part 8b. A support member 4 having a fore end formed in a hemispherical shape is arranged to abut on the chamfered part 1e and to push the cartridge shaft 1b against the fork 8 by means of a spring 5. The support member 4 is rotatable on the same axis as the axis of the fork 8. A cartridge chamber lid 6 is arranged to close the cartridge chamber 3 after the film cartridge 1 is inserted into the cartridge chamber 3. The cartridge chamber lid 6 is provided with a shaft 6a which is arranged to be used for positioning the support member 4 and also with a rotation shaft 7 which is arranged to permit the cartridge chamber lid 6 to rotate thereon. A washer 9 is attached to the shaft 6a with the fore end of the shaft 6a formed into a stopper by heat welding.

In FIG. 1, the cartridge chamber lid 6 is shown as in a completely closed state. In this state, the film cartridge 1 is placed in the cartridge chamber 3. Under this condition, on the upper side of the cartridge shaft 1b, as viewed on FIG. 1, the fork engaging part 1c engages the fork 8. A part A of the cartridge shaft 1b is kept in contact with the flange part 8b of the fork 8 to restrict the vertical position of the film cartridge 1. Therefore, when the fork gear 8a is driven by the driving device (not shown, the film 2 is payed out or taken up.

On the lower side of the cartridge shaft 1b, as viewed on FIG. 1, hemispherical fore end of the support member 4 is in line contact with the chamfered part 1e of the cartridge shaft 1b and engaged therewith. The chamfered part 1e is formed to be coaxial with the engaging hole 1d formed on the support side. The cartridge shaft 1b is thus sandwiched in between the fork 8 and the support member 4. The axial position of the cartridge shaft 1b thus can be correctly regulated. Further, the spring 5 is arranged to urge the support member 4 to move upward. The cartridge shaft 1b is thus pushed at the part A against the flange part 8b of the fork 8. The contact of the two parts are thus ensured by the urging force of the spring 5.

The arrangement described above enables the axial and vertical positions of the cartridge shaft 1b and the film cartridge 1 to be accurately positioned.

FIG. 2 shows the state where the cartridge chamber lid 6 is in process of being closed. While the cartridge chamber lid 6 is in process of being closed by rotating on the rotation shaft 7 in the direction of arrow B, the hemispherical fore end of the support member 4 and the chamfered part 1e first come into contact with each other at a part C on the right side. With the cartridge chamber lid 6 further closed, the support member 4 retreats in the direction of arrow D against the urging force of the spring 5. The support member 4 and the chamfered part 1e then come into contact with each other at the whole circumference to bring about the state shown in FIG. 1.

Figure 3:
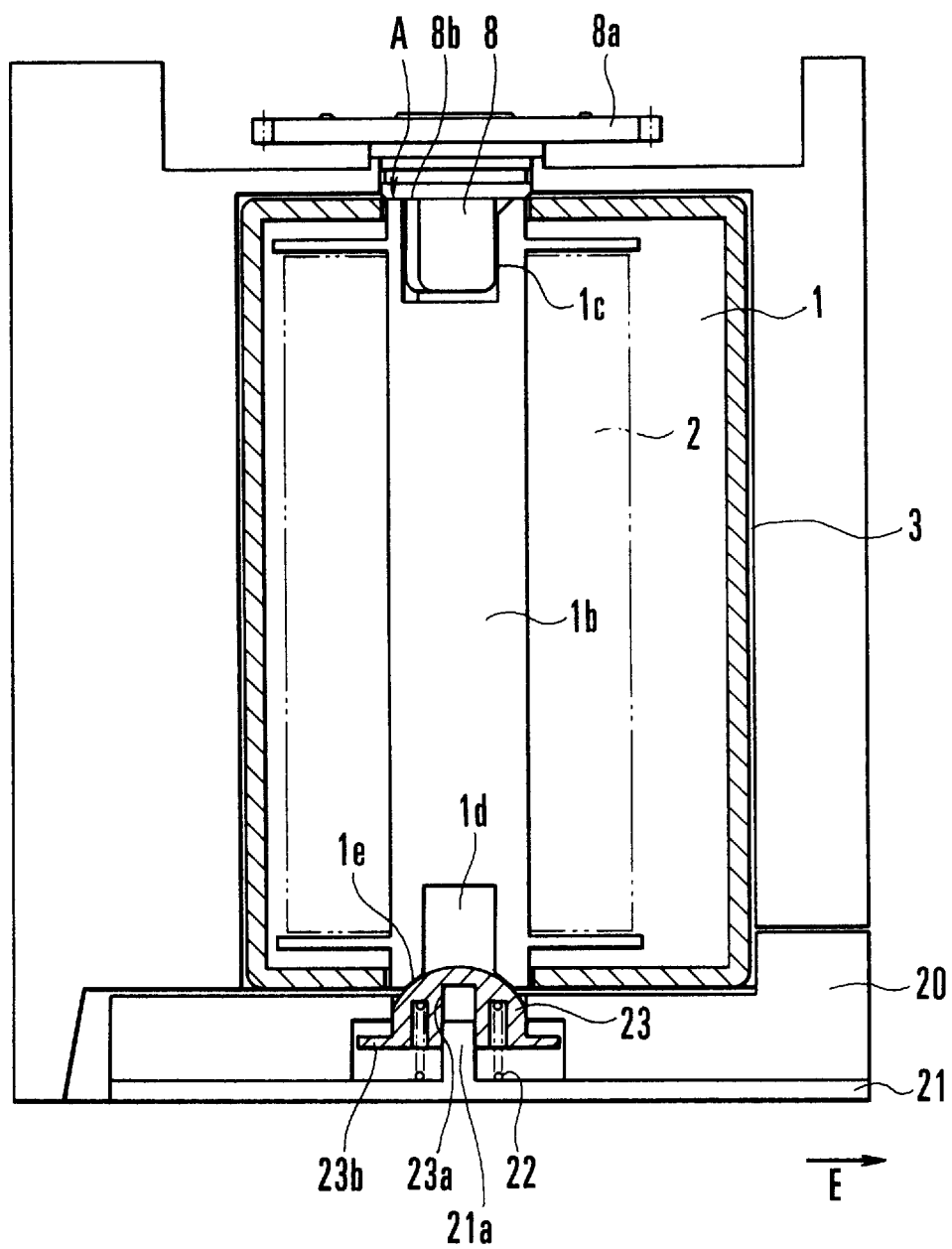
FIG. 3 is a vertical section showing a part around a cartridge chamber of a camera arranged as a second embodiment of this invention.
Figure 4:
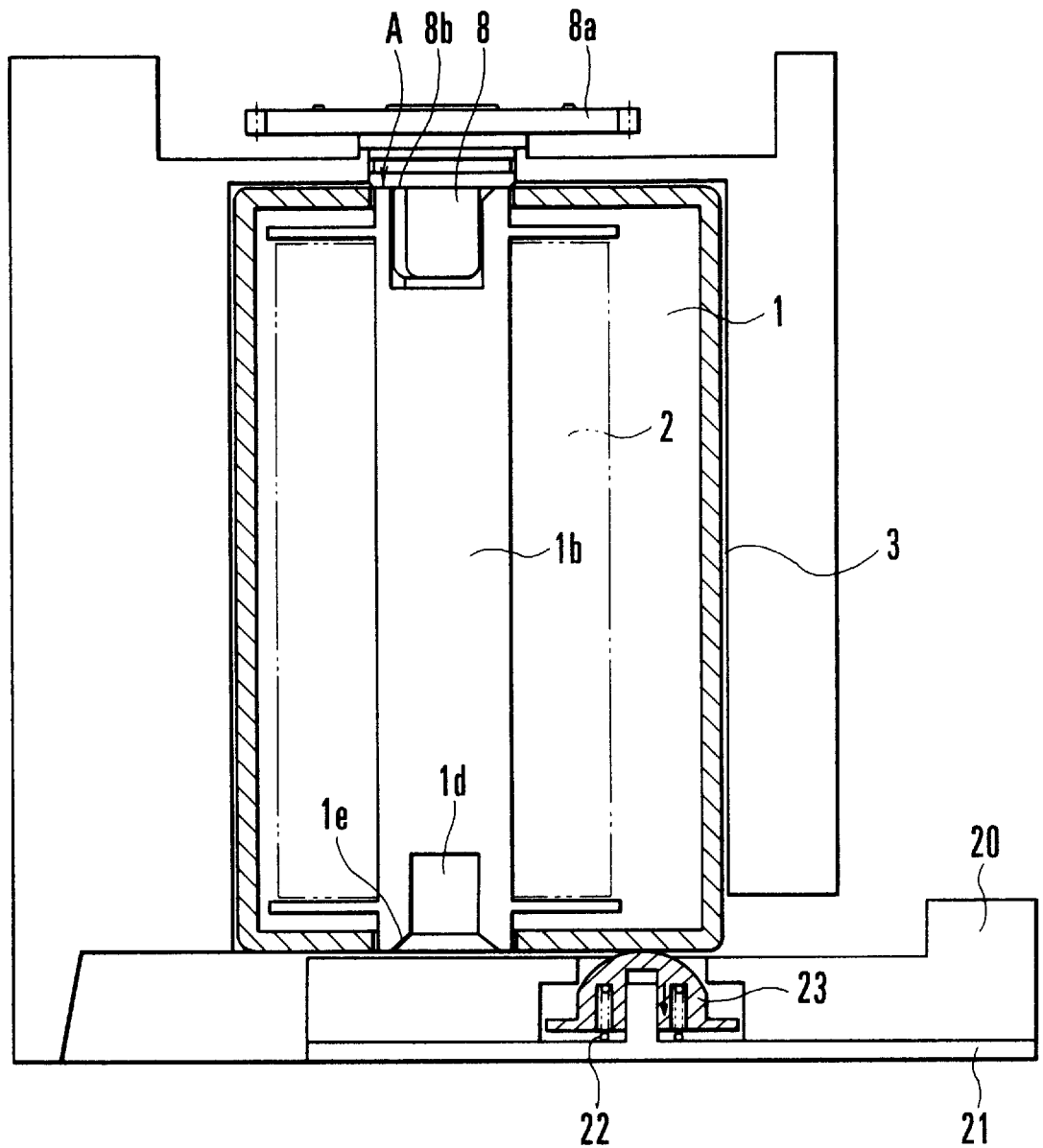
FIG. 4 is a vertical section showing the state where the cartridge chamber lid begins being opened from the state of FIG. 3.
Figure 5:
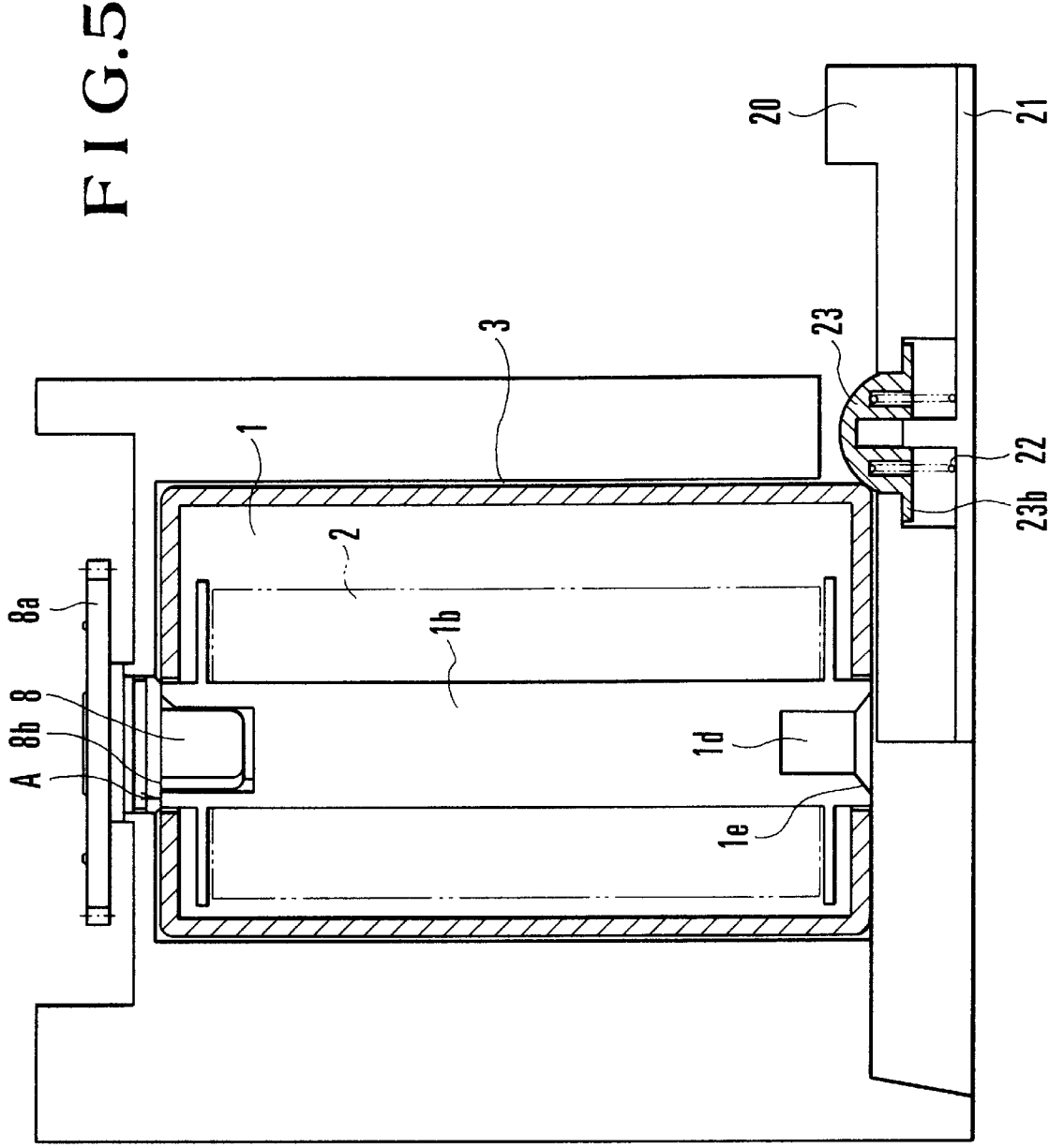
FIG. 5 is a vertical section showing the state where the cartridge chamber lid is being opened further from the state shown in FIG. 4.
Figure 6:
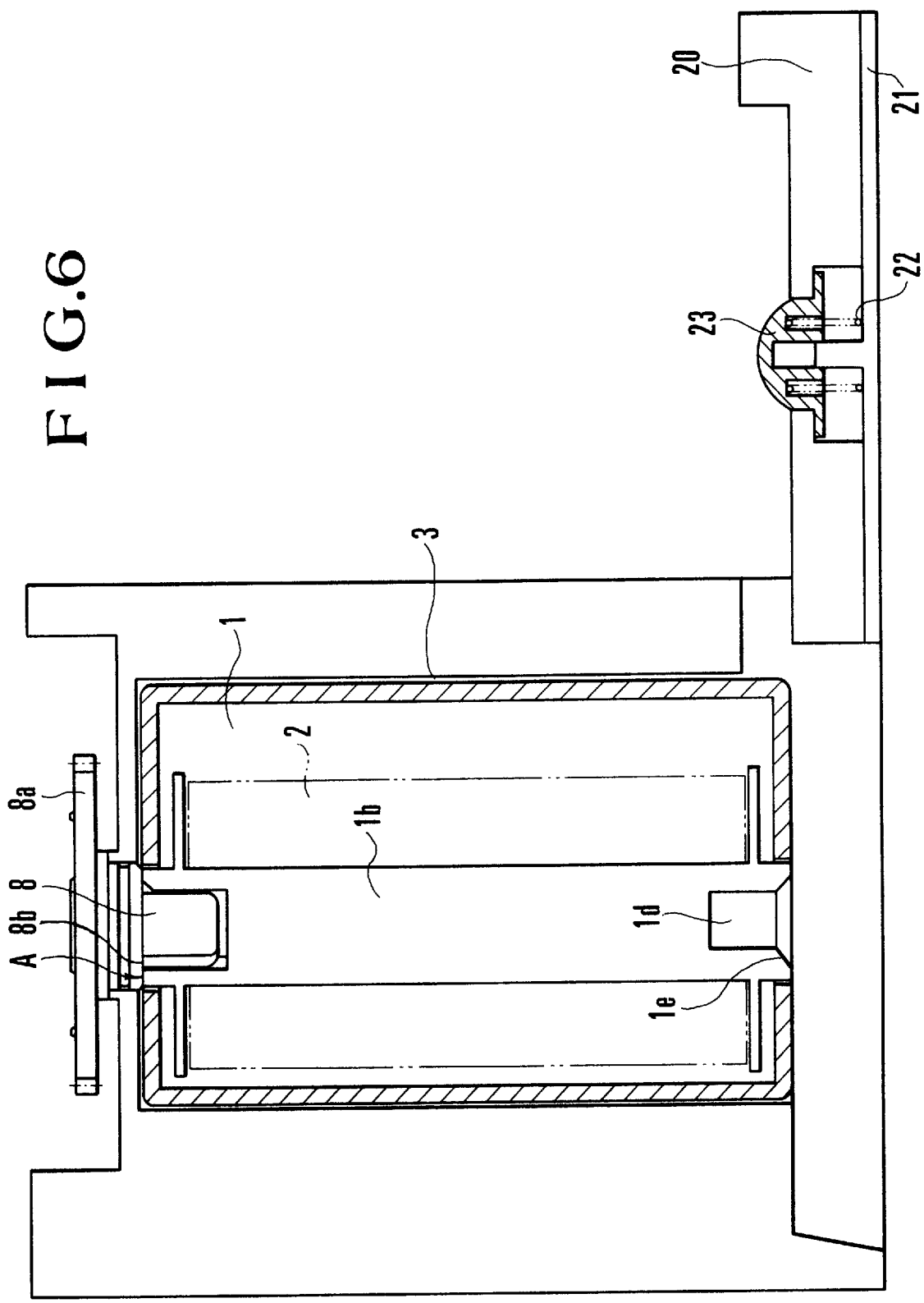
FIG. 6 is a vertical section showing the state where the cartridge chamber lid has been completely opened from the state shown in FIG. 5.

FIGS. 3 to 6 relate to a second embodiment of this invention. In the case of the second embodiment, this invention is applied to a camera of the kind having a cartridge chamber lid arranged to slide perpendicular to the shaft of a film cartridge. FIG. 3 is a vertical section showing a part around a cartridge chamber of the camera. FIGS. 4, 5 and 6 are vertical sections showing different stages of movement taking place around the cartridge chamber. All parts that are the same as those of FIG. 1 are indicated by the same reference numerals.

In FIG. 3, the illustration includes a cartridge chamber lid 20, a cover 21 which is secured to the cartridge chamber lid 20, a shaft 21a which is provided on the cover 21, and a pressing spring 22. A support member 23 has a fore end formed in a hemispherical shape and a fitting engagement hole 23a. The shaft 21a is rotatably fitted into the fitting engagement hole 23. The support member 23 is urged to move upward by the pressing spring 22. The cartridge chamber lid 20 is arranged to be opened by sliding in the direction of arrow E when a driving force of a driving device which is not shown is received.

In FIG. 3, the camera is in the state where the film cartridge 1 is inserted into the cartridge chamber 3 and the cartridge chamber lid 20 is completely closed. Under this condition, the upper side of the cartridge shaft 1b is in the same state as in FIG. 1. On the lower side, the hemispherical fore end of the support member 23 is in line contact with the chamfered part 1e of the cartridge shaft 1b and engaged therewith. The chamfered part 1e is formed coaxially with the support-side engagement hole 1d of the cartridge shaft 1b. The fork 8 and the support member 23 are thus arranged to sandwich the cartridge shaft 1b in between them on one and the same axis. The cartridge shaft 1b is regulated to a correct axial position by this arrangement.

Further, the support member 23 is urged upward by the pressing spring 22. The part A of the cartridge shaft 1b is pushed against the flange part 8b of the fork 8 by the urging force of the spring 22. The spring 22 thus ensures adequate contact of the cartridge shaft 1b and the fork 8.

The arrangement described above enables the axial and vertical positions of the cartridge shaft 1b and the film cartridge 1 to be correctly positioned.

FIG. 4 shows the state where the cartridge chamber lid 20 is in process of being opened by moving to the right (in the direction of arrow E) from the position of FIG. 3. When the cartridge chamber lid 20 is moved to the right from the position of FIG. 3, the support member 23 moves downward against the force of the pressing spring 22 while the hemispherical fore end thereof is kept in contact with the chamfered part 1e of the cartridge shaft 1b.

When the cartridge chamber lid 20 is moved further to the right, the support member 23 disengages from the chamfered part 1e of the cartridge shaft 1b and moves further to the right while the hemispherical fore end thereof comes into contact with the bottom face of the film cartridge 1.

FIG. 5 shows the state where the cartridge chamber lid 20 is in process of being opened by moving further to the right from the position of FIG. 4. With the cartridge chamber lid 20 moved further to the right, when the hemispherical fore end of the support member 23 reaches an end part of the bottom face of the film cartridge 1, the support member 23 is caused to move upward by the pressing spring 22 while the hemispherical fore end thereof is in contact with the end part of the bottom face of the film cartridge 1. A state shown in FIG. 5 is obtained the instant the support member 23 comes to part from the film cartridge 1.

The support member 23 is at a stop in its position shown in FIG. 5 with its stopper part 23b abutting on the cartridge chamber lid 20. When the cartridge chamber lid 20 is moved further to the right, the cartridge chamber lid 20 comes to take a full open position, to allow the film cartridge 1 to be taken out from the cartridge chamber 3, as shown in FIG. 6.

An operation of closing the cartridge chamber lid 20 by moving it to the left from the position shown in FIG. 6 is next described below.

When the cartridge chamber lid 20 is moved to the left, the support member 23 moves downward against the force of the pressing spring 22 while the hemispherical fore end thereof is in contact with the end part of the bottom face of the film cartridge 1, as shown in FIG. 5. When the cartridge chamber lid 20 is moved further to the left, the cartridge chamber lid 20 moves to the left while keeping the hemispherical fore end of the support member 23 in contact with the bottom face of the film cartridge 1 (see FIG. 4).

When the cartridge chamber lid 20 is moved still further to the left, the pressing spring 22 causes the support member 23 to move upward while keeping the hemispherical fore end in contact with the chamfered part 1e of the cartridge shaft 1b. When the cartridge chamber lid 20 is completely closed, there is obtained a state as shown in FIG. 3. The cartridge shaft 1b and the film cartridge 1 are thus positioned as mentioned in the foregoing.

With the second embodiment arranged in the above-stated manner, even when the cartridge chamber lid 20 is arranged to slide perpendicular to the cartridge shaft 1b of the film cartridge 1, the hemispherical fore end of the support member 23 enables the cartridge chamber lid 20 to be opened and closed and the support member 23 to smoothly come into and out of the fitting engagement hole 1d provided in the cartridge shaft 1b.

Further, in each of the first and second embodiments described above, the diameter of the hemispherical fore end of the support member 4 or 23 is arranged to be larger than that of the engaging hole 1d provided on the support side of the cartridge shaft 1b, so that the support member 4 or 23 can be brought into contact with the chamfered part 1e of the film cartridge 1.

Figure 7:
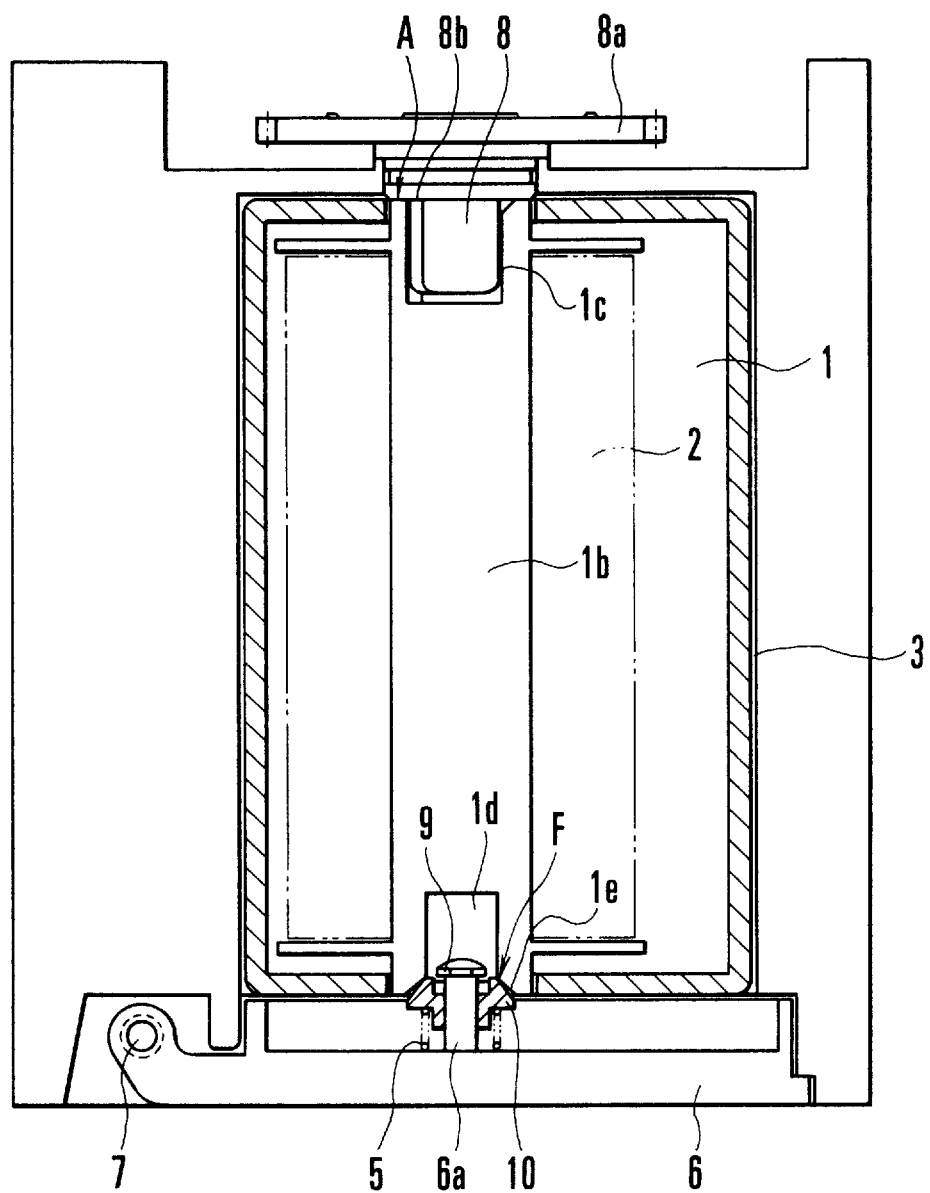
FIG. 7 is a vertical section showing a part around a cartridge chamber of a camera arranged as a third embodiment of this invention.
Figure 8:
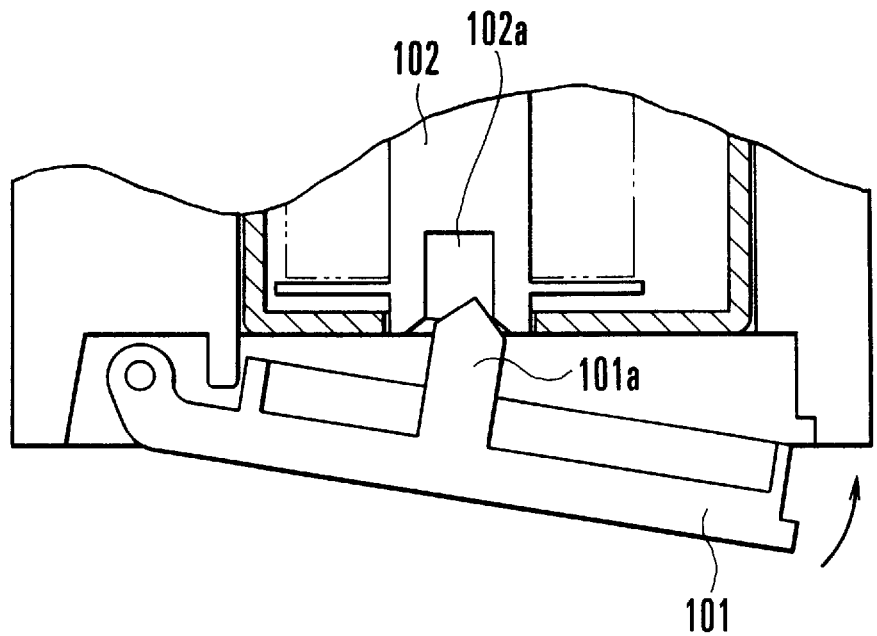
FIG. 8 is a vertical section showing a part around a cartridge chamber of a camera arranged to have a turning type cartridge chamber lid, which is used for describing the background of this invention.
Figure 9:
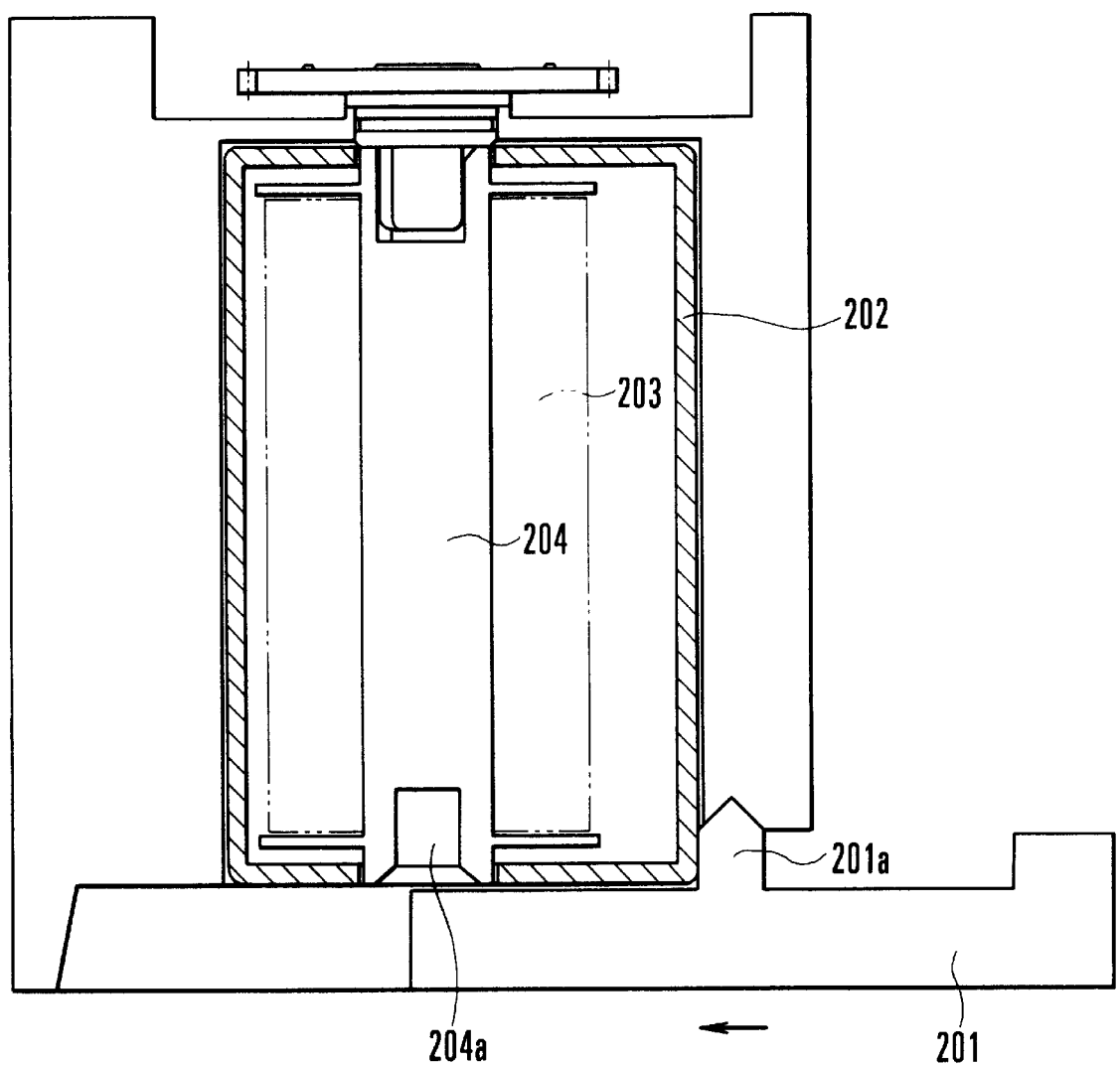
FIG. 9 is a vertical section showing a part around a cartridge chamber of a camera arranged to have a sliding type cartridge chamber lid, which is used for describing the background of this invention.

FIG. 7 is a vertical section showing a cartridge chamber and parts around the cartridge chamber of a camera which is arranged as a third embodiment of this invention. All parts which are the same as those shown in FIG. 1 are indicated by the same reference numerals.

The third embodiment is described with reference to FIG. 7 as follows. A support member 10 which has a fore end formed in a conical shape is caused by a spring 5 to push the cartridge shaft 1b against the fork 8 by abutting on the chamfered part 1e of the film cartridge 1. The support member 10 and the fork 8 are arranged to be rotatable on one and the same axis. FIG. 7 shows the state where the camera has been loaded with the film cartridge 1 by placing the film cartridge 1 in the cartridge chamber 3 and completely closing the cartridge chamber lid 6.

Under this condition, the upper part of the illustration is the same as that of FIG. 1. On the lower side of the illustration, there is shown the support member 10. The diameter of the base of the conical fore end of the support member 10 is larger than that of the engaging hole 1d. Therefore, the support member 10 engages the end part of the chamfered part 1e of the cartridge shaft 1b at a part F by coming into line contact therewith. The end part of the chamfered part 1e is formed to be coaxial with the engaging hole 1d formed on the support side of the cartridge shaft 1b. The cartridge shaft 1b is thus coaxially sandwiched in between the fork 8 and the support member 10. The axial position of the cartridge shaft 1b is thus correctly regulated. The support member 10 is urged by the spring 5 to move upward to push the cartridge shaft 1b against the flange part 8b of the fork 8 at a part A. The two are thus caused to be reliably in contact with each other.

The arrangement described above enables the cartridge shaft 1b and the film cartridge 1 to be accurately set in their axial and vertical positions.

The cartridge chamber lid 6 is closed in the same manner as what is shown in FIG. 2.

In the case of the third embodiment, the support member 10 and the chamfered part 1e are arranged to engage each other at the conical part and the end of a slanting face. This arrangement strongly regulates the axial position and is also strong against any adverse effect of an external force.

In each of the embodiments described above, the support member 4, 10 or 23 which is disposed opposite to the fork 8 across the cartridge shaft 1b to have the cartridge shaft 1b sandwiched in between the support member 4 and the fork 8 is arranged to have its fore end formed in a hemispherical or conical shape. The fore end is arranged to abut on the slanting face of the chamfered part 1e which leads to the engaging hole 1d formed in the cartridge shaft 1b. The arrangement enables the support member to smoothly engage the engaging hole. In a case where the cartridge chamber lid is of the rotating type, the cartridge chamber lid can be more smoothly opened and closed than the conventional arrangement.

Further, the supporting member 4, 10 or 23 has its fore end formed in a hemispherical or conical shape, and a spring is arranged to exert an urging force to push the cartridge shaft 1b against the fork 8 and to cause the support member to be in line contact with the slanting face of the chamfered part 1e which leads to the engaging hole of the cartridge shaft 1b. Therefore, the engaging hole and the support member smoothly engage each other without rattling. Further, in accordance with this invention, the cartridge chamber lid can be smoothly opened and closed irrespective as to whether the lid is of a rotating type or a sliding type.

Further, in each of the embodiments described above, the support member is disposed on the cartridge chamber lid. However, in a case where the apparatus is arranged to have a film cartridge loaded, for example, from a direction perpendicular to the paper surface of FIG. 1, the support member is rotatably arranged coaxially with the rotation axis of the fork on one side opposite to the fork across the film cartridge within the cartridge chamber, instead of on the cartridge chamber lid.

While each of the embodiments described above is arranged to have the chamfered part formed on the engaging hole provided for engaging the support member, the chamfered part is not absolutely necessary. However, it goes without saying that the advantageous effect of this invention can be enhanced by the chamfered part.

Further, the fore end of the support member does not have to be in the hemispherical or conical shape but of course may be of some other curved surface shape.

Further, this invention is of course applicable also to a camera arranged not to have the support member engage the engaging hole of the cartridge shaft.

Further, this invention is applicable also to an apparatus adapted for use of a cartridge of a type other than the type of the cartridge described in the present specification or a cartridge containing an image recording medium other than a film, or also to an apparatus adapted for use of a cartridge of some other kind or arranged to be loaded with something other than a cartridge.

Further, this invention may be practiced in various manners by combining as necessary embodiments described and their technological elements.

Further, in accordance with this invention, the whole or parts of arrangements defined by the appended claims and disclosed by the foregoing description of embodiments may be formed into an independent apparatus or device or into a device adapted to be coupled with other devices or into a component of an apparatus.

Further, the range of possible applications of this invention includes cameras of varied kinds such as a single-lens reflex camera, a lens-shutter camera, a video camera, etc., optical apparatuses and other apparatuses, and also component elements or units to be included in these apparatuses.

The individual components shown in schematic or block form in the drawings are all well-known in the camera arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera for use with an image recording medium cartridge, comprising:

a cartridge chamber;

a cover which opens and closes said cartridge chamber;

a support device which supports said cartridge loaded in said cartridge chamber by supporting an image recording medium supply shaft of said cartridge without supporting a shell of said cartridge, said support device provided on said cover and having a curved surface part which engages said image recording medium supply shaft of said cartridge; and a driving device which drives said image recording medium supply shaft of said cartridge, wherein said driving device and said support device sandwich said cartridge.

2. A camera according to claim 1, wherein said driving device includes a fork for driving a film.

3. A camera according to claim 1, wherein said support device rotates coaxially with a rotation axis of said driving device.

4. A camera according to claim 1, wherein said support device urges said cartridge toward said driving device.

5. A camera according to claim 1, wherein said support device elastically urges said cartridge toward said driving device.

6. An apparatus adapted to an image recording medium cartridge, comprising:

a cartridge chamber;

a cover which opens and closes said cartridge chamber;

a support device which supports said cartridge loaded in said cartridge chamber by supporting an image recording medium supply shaft of said cartridge without supporting a shell of said cartridge, said support device provided on said cover and having a curved surface part which engages said image recording medium supply shaft of said cartridge; and a driving device which drives said image recording medium supply shaft of said cartridge, wherein said driving device and said support device sandwich said cartridge.

7. An apparatus according to claim 6, wherein said driving device includes a fork for driving a film.

8. An apparatus according to claim 6, wherein said support device rotates coaxially with a rotation axis of said driving means.

9. An apparatus according to claim 6, wherein said support device urges said cartridge toward said driving device.

10. An apparatus according to claim 6, wherein said support device elastically urges said cartridge toward said driving device.

* * * * *